US007885924B2

(12) United States Patent
Jones et al.

(10) Patent No.: US 7,885,924 B2
(45) Date of Patent: Feb. 8, 2011

(54) MANAGEMENT OF RECORDED DATA FOR ONLINE SIMULATIONS

(75) Inventors: Angela Richards Jones, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 12/027,368

(22) Filed: Feb. 7, 2008

(65) Prior Publication Data

US 2009/0204898 A1    Aug. 13, 2009

(51) Int. Cl.
*G06F 17/00* (2006.01)
*G06F 17/30* (2006.01)

(52) U.S. Cl. ............... 707/620; 707/754; 707/796; 715/706; 715/719; 715/757

(58) Field of Classification Search ............ 707/636, 707/620, 754, 796; 715/706, 716, 757, 764, 715/719; 463/32, 42; 345/630
See application file for complete search history.

(56) References Cited

U.S. PATENT DOCUMENTS

| | | | | |
|---|---|---|---|---|
| 6,912,565 | B1 * | 6/2005 | Powers et al. | 715/771 |
| 2003/0216962 | A1 * | 11/2003 | Heller et al. | 705/14 |
| 2006/0123351 | A1 * | 6/2006 | Littlefield | 715/768 |
| 2006/0230428 | A1 * | 10/2006 | Craig et al. | 725/133 |
| 2008/0207327 | A1 * | 8/2008 | Van Luchene et al. | 463/42 |
| 2008/0316227 | A1 * | 12/2008 | Fleury et al. | 345/630 |
| 2009/0113313 | A1 * | 4/2009 | Abernethy et al. | 715/757 |
| 2009/0132361 | A1 * | 5/2009 | Titus et al. | 705/14 |
| 2009/0138355 | A1 * | 5/2009 | Jung et al. | 705/14 |
| 2009/0221367 | A1 * | 9/2009 | Longley et al. | 463/32 |

OTHER PUBLICATIONS

Jaynes, C. et al; The Metaverse—A Networked Collection of Inexpensive, Self-Configuring, Immersive Environments; Proceedings of the Workshop on Virtual Environments, pp. 115-124; 2003.*
Zhang, Xiaolong, et al; Social Interactions in Multiscale CVEs; Proceedings pf the 4th International Conference on Collaborative Environments; pp. 31-38; 2002.*

* cited by examiner

*Primary Examiner*—John E Breene
*Assistant Examiner*—Anh Ly
(74) *Attorney, Agent, or Firm*—Scott D. Paul, Esq.; Carey Rodriguez Greenberg & Paul LLP

(57) ABSTRACT

Embodiments of the present invention address deficiencies of the art in respect to online simulations. In one embodiment of the invention, a method for managing recorded data for an online simulation can be provided. The method can include determining that a first experience of a user of the online simulation shall be recorded. The method can further include generating a recording of the first experience and associating metadata with the recording. The method can further include reading metadata of a second experience of the user of the online simulation and determining that the metadata of the second experience matches the metadata of the first experience. The method can further include notifying the user that the recording is associated with the second experience.

15 Claims, 2 Drawing Sheets

MANAGEMENT OF RECORDED DATA FOR ONLINE SIMULATIONS

BACKGROUND OF THE INVENTION

1. Field of the Invention

The present invention relates to the field of online simulations and video games and more particularly relates to the field of management of recorded data for online simulations and video games.

2. Description of the Related Art

In recent years, the World Wide Web has experienced a rapid growth. In this regard, the web has begun to accommodate multiplayer games and simulations, known as online games. A plethora of multiplayer online games and simulations have appeared on the web, ranging from simple board games to complicated virtual reality worlds.

A virtual world is a computer-based simulated environment intended for its users to inhabit and interact via avatars. This habitation usually is represented in the form of two or three-dimensional graphical representations of humanoids (or other graphical or text-based avatars). Most, but not all, virtual worlds allow for multiple users. The world being computer-simulated typically appears similar to the real world, with real world rules such as gravity, topography, locomotion, real-time actions, and communication. Communication can be in the form of text, graphics and/or real-time voice communication using VoIP. These types of virtual worlds are common in massively multiplayer online games, particularly massively multiplayer online role-playing games. A metaverse refers to fully immersive 3D virtual worlds.

Memories and the ability to recall events are a powerful aspect of social communication and business exchange. Conventional virtual world applications do not allow an avatar to have a memory. This limits the ability of a user of the avatar to leverage information obtained in past communications, past commerce transactions, and past experiences in the virtual world. As a user navigates through a virtual world, he is not equipped with automated memory to recall with whom he spoke, where he traveled and how previous business transactions worked out. Thus, users are forced to rely on human recollection, which can be fallible and inefficient.

Therefore, there is a need for improvements over the prior art, and more particularly, there is a need for a way of allowing the recording of events in an online simulation and the management of those recordings.

BRIEF SUMMARY OF THE INVENTION

Embodiments of the present invention address deficiencies of the art in respect to online simulations. In one embodiment of the invention, a method for managing recorded data for an online simulation can be provided. The method can include determining that a first experience of a user of the online simulation shall be recorded. The method can further include generating a recording of the first experience and associating metadata with the recording. The method can further include reading metadata of a second experience of the user of the online simulation and determining that the metadata of the second experience matches the metadata of the first experience. The method can further include notifying the user that the recording is associated with the second experience.

In another embodiment of the invention, a computer system for managing recorded data for an online simulation can be provided. The computer system can include a repository for storing recordings of experiences of users of the online simulation. The computer system can include a processor configured for determining, based on the predefined criteria, that a first experience of a user of the online simulation shall be recorded and storing a recording of the first experience in the repository and associating metadata with the recording. The computer system can further include a processor configured for reading metadata of a second experience of the user of the online simulation and determining that the metadata of the second experience matches the metadata of the first experience. The computer system can further include a processor configured for notifying the user that the recording is associated with the second experience.

In yet another embodiment of the invention, an alternative method for managing recorded data for an online simulation can be provided. The method can include reading metadata of a second experience of a first user of the online simulation and reading metadata of a second user in the second experience, wherein the metadata includes membership of the second user in a social group and metadata about a plurality of recordings of the second user. The method can further include determining that the membership of the second user matches a membership of the first user and determining that the metadata of the second experience matches the metadata at least one of the plurality of recordings. The method can further include notifying the user that the at least one of the plurality of recordings is associated with the second experience.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide an improvement for online simulations. In an embodiment of the invention, a method for managing recorded data for an online simulation is provided. The method of the present invention includes determining whether a current or first experience of a user of the online simulation shall be recorded. This determination is made by accessing a setting predefined by the user, such as an identity of a location or an identity of another user. The present invention evaluates the first experience of the user and determines whether it meets the setting predefined by the user, such as whether the first experience is located at the identified location or includes the identified user. If the setting predefined by the user matches the first experience, then the first experience is recorded and metadata of the first experience (such as the location of the first experience or the identity of another user in the first experience) is associated with the recording. Next, the user encounters a later, second experience and the present invention reads the metadata of the second experience. If the metadata of the first experience matches the metadata of the second experience, then the user is notified that the recording of the first experience is associated with the second experience.

Figure 1:
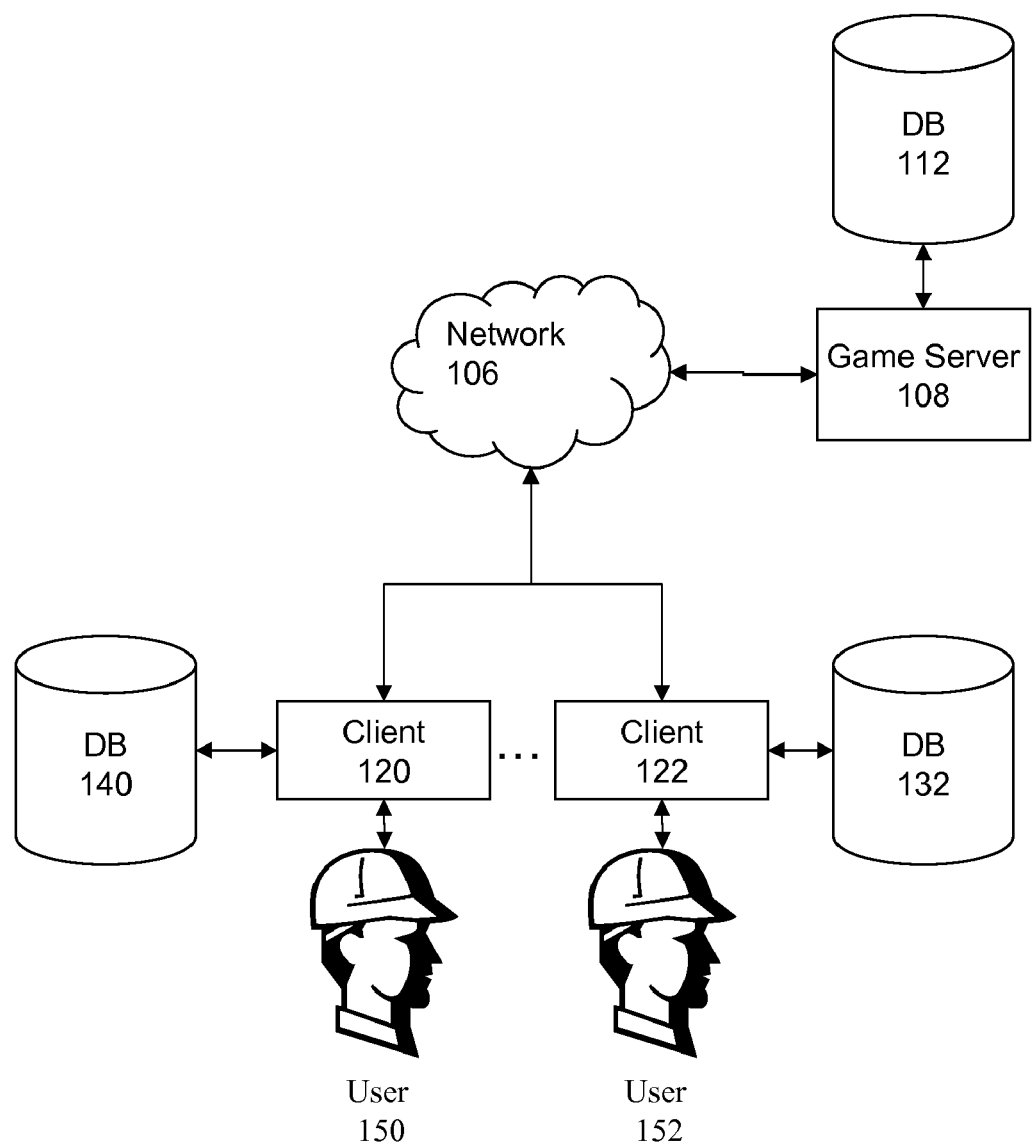
FIG. 1 is an illustration of a block diagram showing the network architecture of an application in accordance with the principles of the present invention.

Referring now to the drawing figures in which like reference designators refer to like elements, there is shown in FIG. 1 an illustration of a block diagram showing the network architecture of an application in accordance with the principles of the present invention. The exemplary embodiments of the present invention adhere to the system architecture of FIG. 1. FIG. 1 shows an embodiment of the present invention wherein users 150-152 utilize client computers 120, 122, respectively, to interact with game server 108 over a network 106, such as in an application service provider implementation.

FIG. 1 shows that connected to network 106 are client computers 120-122, which comprise, for example, workstations, desktop personal computers or servers. The game server 108 serves an online simulation to multiple players. The game server 108 may further provide management of recorded memories, as described in greater detail below. In this patent application, the term "online simulation" is used to refer to any game, simulation, virtual world or any computer-based simulated environment that is accessed over a network, such as the global internet or the web. Game server 108 may be any commercially available server, such as the IBM eServer xSeries server. It should be noted that although FIG. 1 shows only client computers 120-122 and one game server 108, the system of the present invention supports any number of users and servers connected to the network 106.

In one embodiment of the present invention, the application of game server 108 is a client-server application having a client portion that resides on the computers 120-122 and a server application that resides on game server 108. In another embodiment of the present invention, the client portion of the application of game server 108 that resides on the computers 120-122 is simply a web browser. In another embodiment of the present invention, the game of game server 108 is an online multi-player 3D simulation, such as a virtual world, which is played by users 150-152 via network 106.

FIG. 1 further shows game server 108 includes a database 112. Also, each computer 120, 122 includes a database 140, 132, respectively. The databases 112, 140, 132 are a repository for data used by computers 120-122 and game server 106 during the course of operation. The data stored in databases 140, 112, 132 is described in greater detail below. The databases 140, 112, 132 may adhere to any one of the flat model, hierarchical model, object-oriented model or a relational model for databases. Further, the databases 140, 112, 132 can be any commercially available database, such as an IBM DB2 database server.

The databases 140, 112, 132 may also include a database management system, which is an application that controls the organization, storage and retrieval of data (fields, records and files) in a database. A database management system accepts requests for data from a server and instructs the operating system to transfer the appropriate data. A database management system may also control the security and integrity of a database. Data security prevents unauthorized users from viewing or updating certain portions of a database.

In an embodiment of the present invention, the computer systems of computers 120-122 and game server 108 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems of computers 120-122 and game server 108 are a server system, such as SUN Ultra workstations running a SunOS operating system or IBM RS/6000 workstations and servers running the AIX operating system.

In an embodiment of the present invention, the network 106 is a circuit switched network, such as the Public Service Telephone Network (PSTN). In another embodiment, the network 106 is a packet switched network. The packet switched network is a wide area network (WAN), such as the global Internet, a private WAN, a local area network (LAN), a telecommunications network or any combination of the above-mentioned networks. In yet another embodiment, the structure of the network 106 is a wired network, a wireless network, a broadcast network or a point-to-point network.

Figure 2:
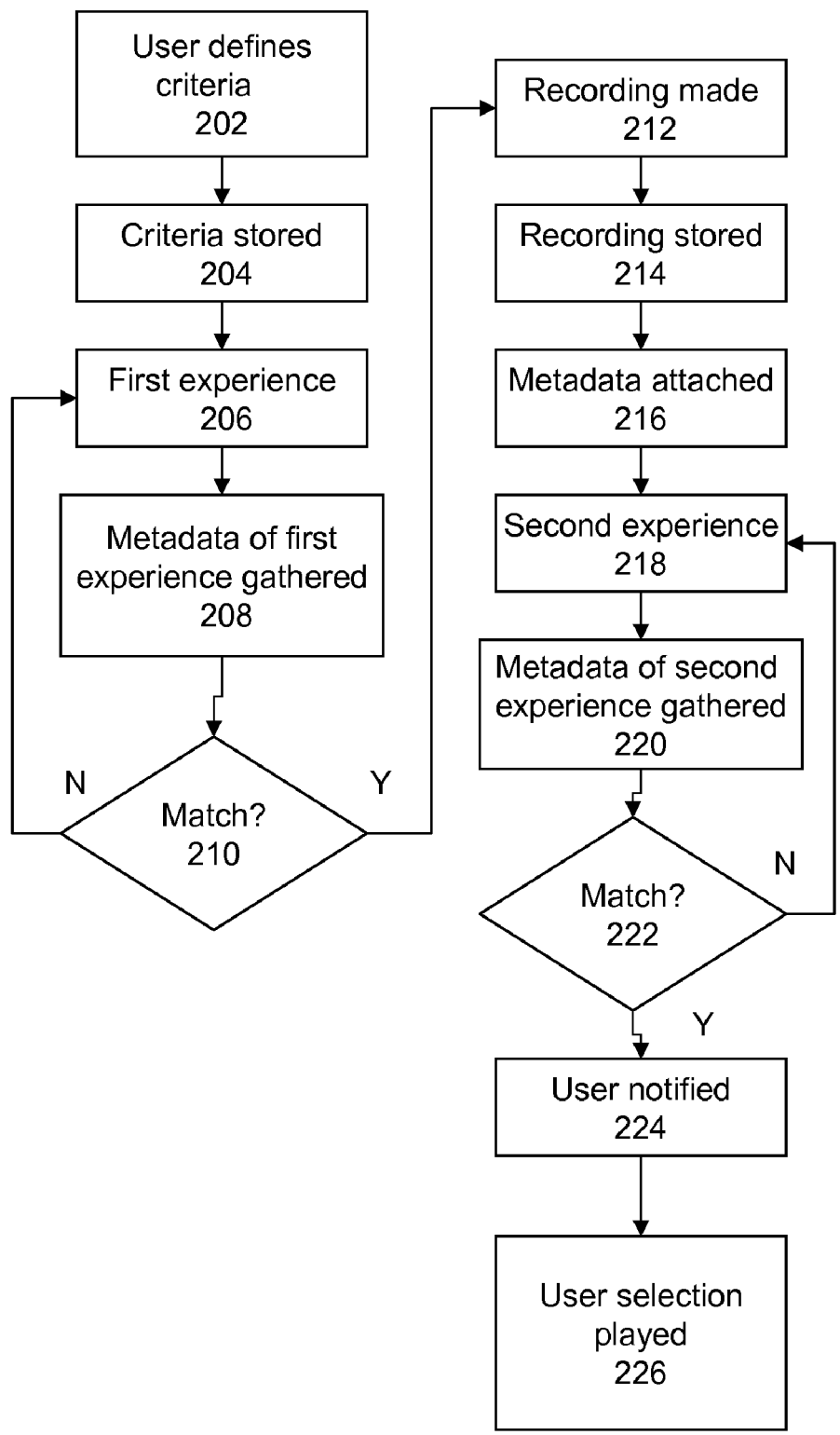
FIG. 2 is a flow chart depicting the control flow of the process by which experiences within the online simulation are recorded, according to one embodiment of the present invention.

FIG. 2 is a flow chart depicting the control flow of the process by which experiences within the online simulation are recorded, according to one embodiment of the present invention. The flowchart of FIG. 2 describes the process effectuated by game server 108 of FIG. 1, so as to facilitate the management of recorded experiences. In another embodiment of the present invention, the flowchart of FIG. 2 describes the process effectuated by a client computer 120, 122 of FIG. 1.

In step 202, a user of the online simulation, such as user 150, defines a criteria for recording an experience. For example, the user 150 may define a location within the virtual world of the online simulation, an identity of another user or another avatar in the online simulation, an identity of an event, such as a concert or a business transaction, or a type of product, such as a watch or a car. The user 150 may further define a type of communication such as instant messaging, chatting, emailing or speaking. In another example, the user 150 may define a specific time to record an experience. In step 204, the defined criteria is stored in database 112 or, alternatively, the database 140 of the computer 120 of the user 150.

In step 206, the user 150 encounters a first experience in the online simulation. An experience may comprise a communication with another user, a business transaction, attendance at an event such as a concert, travel through a region or area, entrance into a structure, or the like. In step 208, the present invention gathers metadata about the first experience. The metadata gathered by the present invention may comprise an identity of the location of the avatar of the user 150, an identity of another user within proximity of the avatar or the user 150, an identity of a social group to which another user within proximity of the avatar or the user 150 belongs, an identity of a current event, or an identity of a product within a proximity of the avatar of user 150.

In step 210, the present invention determines whether the metadata of the first experience matches the criteria defined by the user 150. In one embodiment of the present invention, if any portion of the metadata of the first experience matches any portion of the criteria defined by the user 150, then a match is made. If the result of the determination of step 210 is positive, then control flows to step 212. If the result of the determination of step 210 is negative, then control flows back to step 206.

In another embodiment of the present invention, the method by which the present invention determines whether to record an experience is user input. In this embodiment, in lieu of steps 202-210 above, the user 150 interacts with an interface to issue a command to record the first experience. The user interface may be a graphical user interface that accepts textual input from the user 150 or input via buttons and other interface widgets. Alternatively, the user interface may be a voice interface that allows the user 150 to issue a voice command that is recognized by the present invention.

In step 212, a recording of the first experience is made. In one embodiment of the present invention, the recording comprises a video and audio recording of the experience of the avatar of user 150 from the point of view of the avatar. In step 214, the recording is stored in the database 112 or, alternatively, the database 140 of the computer 120 of the user 150.

In step 216, metadata of the first experience is associated with the stored recording. In one embodiment of the present invention, step 216 comprises adding a list of keywords to the recording stored in the database 112, such as a list of words defining the metadata of the first experience. In an embodiment of the present invention, step 216 further includes storing attributes that are associated with the stored recording. Such attributes includes the date of the experience, the name of the owner of the experience, the time of the experience, the names of other users in the experience, or the like.

In an embodiment of the present invention, step 216, wherein metadata of the first experience is associated with the stored recording, further includes storing a file sharing indicator that indicates whether the stored recording is private, to be accessed only by the user 150, or public, to be accessed by other users, such as user 152. In another embodiment of the present invention, the indicator can further indicate with specificity which users are allowed to access the stored recording. In a further embodiment, a file sharing indicator may automatically be associated with a recording based on a membership of the user 150. For example, if the user 150 is a member of an organization, then any experience recorded for the user 150 is associated with a file sharing indicator that allows members of the organization to view the recording.

In an embodiment of the present invention, step 216, wherein metadata of the first experience is associated with the stored recording, further includes the addition of tags to the stored recording. A tag can be a text string that is used to identify, describe or distinguish a recording. Tags may be automatically associated with a recording or they may be associated with a recording at the request of the user 150. For example, the user 150 may open a graphical user interface wherein he may input a "concert" tag that is associated with a recording of an experience involving a music concert. In another example, the user 150 may input a "beach" tag that is associated with a recording of an experience involving a beach.

In step 218, the user 150 encounters a second experience in the online simulation. In step 220, the present invention gathers metadata about the second experience. In step 222, the present invention determines whether the metadata of the first experience matches the metadata of the second experience. In one embodiment of the present invention, if any portion of the metadata of the first experience matches any portion of the metadata of the second experience, then a match is made. In one embodiment of the present invention, step 222 further comprises determining whether the social group of an avatar in the second experience matches the social group of the user 150. If the result of the determination of step 222 is positive, then control flows to step 224. If the result of the determination of step 222 is negative, then control flows back to step 218.

In step 224, the present invention notifies the user 150 that the first experience is relevant to the second experience. For example, the present invention may present a message or a graphical user interface to the user 150 indicating that the first experience, or any number of previous experiences, is relevant to the second experience. The graphical user interface may present a list or a pull down menu that presents a list of recordings of relevant experiences. In step 226, the user 150 may then click on any of the selections to view the recording of the relevant experiences, and in response the selected recording is played for the user 150.

In an embodiment of the present invention, the memories recorded in step 216 may be accessed, removed, exchanged or sold by the user 150 at any time. In this embodiment, the user 150 may be presented with a graphical user interface that can be used to browse a list of recorded experiences listed by topic, location, date or any other category of metadata or tag associated with any recorded experience. Using this interface, the use 150 may select recordings to view, edit or remove them. The user 150 may further use this interface to edit, add or remove metadata, tags or file sharing indicators associated with recordings. Further, the user 150 may search for recordings by doing a keyword search on data associated with each recording. A keyword search comprises receiving a keyword or keywords from the user 150 and searching for that keyword among the tags or metadata associated with each recorded experience.

In one embodiment of the present invention, an alternative to steps 220-226 is provided below. In alternative step 220, the present invention gathers metadata about the second experience and further gathers metadata about another avatar in the second experience. The metadata about another avatar may include an identity of the other avatar and an identity of a social group with which the avatar is associated. The metadata about the other avatar may further include metadata about recordings of the other avatar.

In alternative step 222, the present invention determines whether the metadata of the other avatar matches the metadata of the second experience. Specifically, in alternative step 222, the present invention determines whether any recordings of the other avatar match the second experience of user 150. Also in alternative step 222, the present invention determines whether the social group of the user 150 matches the social group of the other avatar based on the metadata collected about the other avatar in alternative step 220. If the result of the determinations of alternative step 222 is positive, then control flows to alternative step 224. If the result of the determinations of alternative step 222 is negative, then control flows back to alternative step 218.

In alternative step 224, the present invention notifies the user 150 that certain recordings of the other avatar are relevant to the second experience. For example, the present invention may present a message or a graphical user interface to the user 150 indicating that certain recordings of the other avatar are relevant to the second experience. The graphical user interface may present a list or a pull down menu that presents a list of recordings of relevant experiences. In alternative step 226, the user 150 may then click on any of the selections to view the recording of the relevant experiences, and in response the selected recording is played for the user 150.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a RAM, a ROM, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for managing recorded data for an online simulation, comprising:
   receiving a definition describing criteria for recording an experience of a user in the online simulation;
   generating a recording of a first experience of the user in the online simulation based upon the definition;
   associating first metadata with the recording;
   associating second metadata with a second experience;
   comparing the second metadata to the first metadata; and
   upon a match between the second metadata and the first metadata, notifying the user that the recording is associated with the second experience;
   wherein the metadata includes an identity of an avatar in the first experience;
   a location of the first experience, an identity of an event in the first experience, and
   a tag describing the first experience; and
   wherein the notifying further comprises:
   displaying a message indicating that the recording is associated with the second experience; and providing, to the user, a graphical user interface for receiving a command from the user to play the recording.

2. The computer-implemented method of claim 1, further comprising:
   upon the first user being notified of the recording, receiving a command from the user to play the recording; and
   playing the recording for the user.

3. The computer-implemented method of claim 1, wherein the definition is defined by the user.

4. The computer-implemented method of claim 1, wherein the recording includes video and audio.

5. The computer-implemented method of claim 1, wherein the match occurs upon at least one portion of the second metadata matches at least one portion of the first metadata.

6. A computer system for managing recorded data for an online simulation, comprising:
   a repository configured to store recordings of experiences of users of the online simulation; and
   at least one processor, wherein the at least one processor is configured for:
   receiving a definition describing criteria for recording an experience of a user in the online simulation;
   generating a recording of a first experience of the user in the online simulation based upon the definition;
   associating first metadata with the recording;
   associating second metadata with a second experience;
   comparing the second metadata to the first metadata; and
   upon a match between the second metadata and the first metadata, notifying the user that the recording is associated with the second experience;
   wherein the metadata includes an identity of an avatar in the first experience;
   a location of the first experience, an identity of an event in the first experience, and
   a tag describing the first experience; and
   wherein the notifying further comprises:
   displaying a message indicating that the recording is associated with the second experience; and providing, to the user, a graphical user interface for receiving a command from the user to play the recording.

7. The computer system of claim 6, wherein the at least one processor is further configured for:
   upon the first user being notified of the recording, receiving a command from the user to play the recording; and
   playing the recording for the user.

8. The computer system of claim 6, wherein the definition is defined by the user.

9. The computer system of claim 6, wherein the recording includes video and audio.

10. The computer system of claim 6, wherein the match occurs upon at least one portion of the second metadata matches at least one portion of the first metadata.

11. A computer program product comprising computer-readable storage medium having stored therein computer usable program code for managing recorded data for an online simulation, the computer usable program code, upon being executed by a computer hardware device, causes the computer hardware device to perform the operations of:
   receiving a definition describing criteria for recording an experience of a user in the online simulation;
   generating a recording of a first experience of the user in the online simulation based upon the definition;
   associating first metadata with the recording;
   associating second metadata with a second experience;
   comparing the second metadata to the first metadata; and
   upon a match between the second metadata and the first metadata, notifying the user that the recording is associated with the second experience;
   wherein the metadata includes an identity of an avatar in the first experience;
   a location of the first experience, an identity of an event in the first experience, and
   a tag describing the first experience; and
   wherein the notifying further comprises:
   displaying a message indicating that the recording is associated with the second experience; and providing, to the user, a graphical user interface for receiving a command from the user to play the recording.

12. The computer program product of claim 11, where in the computer hardware device is further caused to:
   upon the first user being notified of the recording, receive a command from the user to play the recording; and
   play the recording for the user.

13. The computer program product of claim 11, wherein the definition is defined by the user.

14. The computer program product of claim 11, wherein the recording includes video and audio.

15. The computer program product of claim 11, wherein the match occurs upon at least one portion of the second metadata matches at least one portion of the first metadata.

* * * * *